United States Patent Office 3,649,698
Patented Mar. 14, 1972

3,649,698
PREPARATION OF HALOALKANES
Louis Schmerling, Riverside, Ill., assignor to Universal Oil Products Company, Des Plaines, Ill.
No Drawing. Filed Dec. 2, 1968, Ser. No. 780,565
Int. Cl. C07c 17/28
U.S. Cl. 260—648 R                                13 Claims

ABSTRACT OF THE DISCLOSURE

Haloalkanes are prepared by condensing an alkyl halide with an unsaturated hydrocarbon or a halogenated unsaturated hydrocarbon at condensation conditions in the presence of a catalyst comprising a cupric chloride-aluminum chloride complex.

---

This invention relates to a process for the conversion of alkyl halides. More specifically, the invention is concerned with a process for treating alkyl halides with unsaturated hydrocarbons or halogenated unsaturated hydrocarbons in the presence of a novel catalytic composition of matter of a type hereinafter set forth in greater detail whereby higher molecular weight haloalkanes are formed.

Heretofore, it has been known to condense alkyl halides with unsaturated hydrocarbons and particularly olefinic hydrocarbons or halogenated olefinic hydrocarbons in the presence of metal halide catalysts which are commonly known as Friedel-Crafts type catalysts. These catalysts will include aluminum chloride, aluminum bromide, zinc chloride, ferric chloride, zirconium chloride, etc. However, the use of these catalysts will entail certain disadvantages. For example, when utilizing an active Friedel-Crafts catalyst such as aluminum chloride or ferric chloride, viscous complexes of the catalyst and organic compounds (so-called sludges) are formed, making use of the catalysts in continuous flow operation impractical. Furthermore, when utilizing a very active catalyst, it is usually necessary to effect the reaction at sub-atmospheric temperatures due to the high degree of activity of the catalyst. The necessity of using these sub-atmospheric temperatures, which will usually range from about −20° to about 0° C. when aluminum chloride is used, will therefore necessitate the use of complex equipment which will include cooling means necessary to maintain the required operating temperature. These cooling means will include external coils or internal coils through which heat exchange compounds are passed. In addition, the cooling means might include ice baths wherein Dry Ice-acetone mixtures are used to lower the temperature of the reaction. When utilizing Friedel-Crafts catalysts of lesser activity, such as zinc chloride, it is necessary to utilize elevated temperatures. This also has a disadvantage inasmuch as the apparatus in which the reaction is effected must therefore require heating means.

In contradistinction to these aforementioned disadvantages, it has now been discovered that higher molecular weight haloalkanes may be prepared by condensing an alkyl halide with an unsaturated hydrocarbon or a halogenated unsaturated hydrocarbon in the presence of a certain catalytic composition of matter of a type hereinafter set forth in greater detail whereby the process may be effected in a continuous manner of operation at temperatures in the range of from about 10° C. to about 50° C.

It is therefore an object of this invention to provide a process for the condensation of alkyl halides with unsaturated hydrocarbons or halogenated unsaturated hydrocarbons in the presence of a catalyst comprising a cupric-aluminum chloride complex to obtain higher molecular weight haloalkanes.

Another object of this invention is to provide a novel catalyst for condensing alkyl halides with unsaturated hydrocarbons or halogenated unsaturated hydrocarbons in a continuous manner of operation to provide the desired higher molecular weight haloalkanes.

One aspect of this invention is found in a process for the condensation of an alkyl halide with an unsaturated hydrocarbon or halogenated unsaturated hydrocarbon which comprises treating said halide and hydrocarbon at condensation conditions in the presence of a catalyst comprising a cupric chloride-aluminum chloride complex, and recovering the resultant higher molecular weight haloalkane.

A specific embodiment of this invention is found in a process for the condensation of t-butyl chloride with ethylene at ambient temperature and a pressure in the range of from about atmospheric to about 100 atmospheres in the presence of a catalyst comprising an anhydrous cupric-aluminum chloride complex and recovering the resultant neohexyl chloride.

Other objects and embodiments will be found in the following further detailed description of the present invention.

As hereinbefore set forth, the present invention is concerned with a process for preparing higher molecular weight haloalkanes. The compounds which are prepared according to the process of this invention utilizing a novel catalyst for the reaction will find a wide variety of uses in the chemical field. For example, the higher molecular weight haloalkanes may be converted to hydrocarbons which are utilized as components of gasoline, the hydrocarbons containing a highly branched-chain structure being utilized in the production of high-octane gasoline. In addition, the compound such as neohexyl chlorde (1-chloro-3,3-dimethylbutane) may be used as an intermediate in the preparation of pharmaceutical compounds including some compounds which are useful as soporifics.

Examples of alkyl halides which are condensed with unsaturated hydrocarbons or halogenated unsaturated hydrocarbons include in particular the alkyl chlorides and alkyl bromides containing at least 3 carbon atoms per molecule and preferably containing from at least 3 to about 20 carbon atoms per molecule. Specific examples of these alkyl halides will include n-propyl chloride, n-propyl bromide, isopropyl chloride, isopropyl bromide, n-butyl chloride, n-butyl bromide, isobutyl chloride, isobutyl bromide, sec-butyl chloride, sec-butyl bromide, t-butyl chloride, t-butyl bromide, n-pentyl chloride, n-pentyl bromide, sec-pentyl chloride, sec-pentyl bromide, t-pentyl chloride, t-pentyl bromide, n-hexyl chloride, n-hexyl bromide, sec-hexyl chloride, sec-hexyl bromide, t-hexyl chloride, t-hexyl bromide, the isomeric heptyl, octyl, nonyl, decyl, undecyl, dodecyl, tridecyl, tetradecyl, pentadecyl, hexadecyl, heptadecyl, octadecyl, nonadecyl, eicosyl chlorides and bromides, etc. In addtion, it is also contemplated within the scope of this invention that cycloalkyl halides may be included within the generic term "alkyl halides" as used in the present specification and appended claims. Some specific representative examples of these will include cyclopentyl chloride, cyclopentyl bromide, cyclohexyl chloride, cyclohexyl bromide, cycloheptyl chloride, cycloheptyl bromide, cyclooctyl chloride, cyclooctyl bromide, 1-methylclopentyl chloride, 1-methylcyclopentyl bromide, 1-ethylcyclopentyl chloride, 1-ethylcyclopentyl bromide, 1-methylcyclohexyl chloride, 1-methylcyclohexyl bromide, 1-ethylcyclohexyl chloride, 1-ethylcyclohexyl bromide, 1-methylcycloheptyl chloride, 1-methylcycloheptyl bromide, etc. It is also contemplated within the scope of this invention that the corresponding iodides may also be used, although not necessarily with equivalent results. Of the aforementioned alkyl halides, the tertiary alkyl halides constitute the preferred starting materials of the present invention.

Suitable unsaturated hydrocarbons and halogenated unsaturated hydrocarbons which may be condensed with the aforementioned alkyl halides will include ethylene, propene, 1-butene, 2-butene, 1-pentene, 2-pentene, 1-hexene, 2-hexene, 3-hexene, 1-heptene, 2-heptene, 3-heptene, etc.; halogenated unsaturated hydrocarbons, which may also be referred to as halo-olefins such as vinyl chloride, vinylidene chloride, cis-1,2-dichloroethylene, 1,3-dichloropropylene, 1-chloro-1-butene, 1,4-dichloro-1-butene, 1-chlorocyclohexene, etc. It is also contemplated within the scope of this invention that acetylenic hydrocarbons including acetylene, propyne, 1-butyne, 1-pentyne, etc., as well as halogenated derivatives thereof, may also be used, although not necessarily with equivalent results. It is to be understood that the aforementioned alkyl halides, unsaturated hydrocarbons, and halogenated unsaturated hydrocarbons hereinbefore listed are only representatives of the class of compounds which may be used and that the present invention is not necessarily limited thereto.

The aforementioned condensation of the alkyl halide with the unsaturated hydrocarbon or halogenated unsaturated hydrocarbon will be effected at temperatures in the range of from about 10° C. to about 50° C., ambient temperatures being generally preferred, and at a pressure in the range of from about atmospheric to about 100 atmospheres or more, the pressure used being that which is necessary to maintain a major portion of the reactants in the liquid phase. In addition, the pressure will usually be autogenous, being supplied, if necessary, by the introduction of the olefinic hydrocarbon such as ethylene, propene, the butenes, etc. However, if higher operating pressures are desired, they may be supplied by the introduction of an inert gas such as nitrogen into the reaction zone. The two reactants may be present in equimolar proportions or either may be present in a molar excess over the other. For example, if the unsaturated hydrocarbon or halogenated unsaturated hydrocarbon is tertiary in configuration, the alkyl halide should be present in a molar excess ranging from about 2:1 up to about 5:1 or more moles of alkyl halide per mole of olefin in order that the polymerization of the olefin is minimized. It is also contemplated that if the unsaturated hydrocarbon is normal in configuration, such as ethylene or propylene, said unsaturated hydrocarbon may be present in a molar excess over the alkyl halide, said molar excess being in a range of from about 1.1:1 to about 5:1 moles of unsaturated hydrocarbon per mole of alkyl halide.

The catalytic composition of matter which is novel for this type of condensation comprises a granular complex which is prepared by admixing equimolar quantities of aluminum chloride and a higher valence halide of a metal which forms at least two metal halides differing in valence. A particularly preferred compound of this type comprises anhydrous cupric chloride, the anhydrous cupric chloride and aluminum chloride forming the complex $Al_3Cl_3 \cdot CuCl_2$. As hereinbefore set forth, the catalytic complex has the advantage over previously used Friedel-Crafts catalysts in that it will remain in a granular form during the reaction, rather than forming a sludge, and may therefore be readily used in a continuous type of operation.

The process of the present invention utilizing the novel catalyst for said process may be effected in any suitable manner and may comprise either a batch or continuous type operation. When utilizing a batch type operation, a quantity of the alkyl halide which is to undergo condensation is placed in an appropriate apparatus. This type of apparatus may be an alkylating flask, if the unsaturated hydrocarbon or halogenated unsaturated hydrocarbon is in liquid form, or it may be an autoclave or any other pressure vessel, if the unsaturated hydrocarbon is in gaseous form. In addition, the apparatus to be used will also contain the catalyst complex. The unsaturated hydrocarbon or halogenated unsaturated hydrocarbon is added to the reactor and the reaction is allowed to proceed for a predetermined period of time which may range from about 0.5 up to about 10 hours or more in duration. Alternatively, a mixture of the reactants may be added gradually to the catalyst (or vice versa). Upon completion of the desired residence time, the reaction mixture is recovered and the desired product comprising the higher molecular weight haloalkane is separated from the catalyst and any unreacted starting material or undesired side products which may have occurred during the reaction and recovered.

As hereinbefore set forth, the preferred method by which the process of this invention may be effected is a continuous type operation. Due to the fact that the catalyst complex will remain in granular form, the continous type operation may be effected by placing the catalyst in a bed in the reaction zone. The alkyl halide is then charged to the reaction zone, which is maintained at the proper operating conditions of temperature and pressure, through one line while the unsaturated hydrocarbon or halogenated unsaturated hydrocarbon is charged thereto through a separate line. Alternatively speaking, the two reactants may be admixed prior to entry into said reactor and the mixture charged thereto in a single stream. After completion of the desired residence time, the reactor effluent is continuously discharged and subjected to conventional separation means whereby the higher molecular weight monoalkane is separated from any unreacted starting material and recovered, the aforesaid unreacted starting material being then recycled to form a portion of the feed stock. While the catalyst is disposed as a fixed bed in the reactor, the charge stock comprising the two reactants may be passed through the catalyst in either an upward, downward, or radial flow. Other types of continuous methods of operation which may be used due to the particular physical properties of the catalyst complex will include a moving bed type of operation in which the reactants and the catalyst are moved either concurrently or countercurrently to each other while passing through said reaction zone, or the slurry type operation in which the catalyst is carried into the reaction zone as a slurry in either one or both of the reactants.

Examples of higher molecular weight haloalkane which may be prepared according to the process of the invention will include neohexyl chloride (1-chloro-3,3-dimethylbutane),
neohexyl bromide (1-bromo-3,3-dimethylbutane),
1,1,2-trichloro-3,3-dimethylbutane,
1,1,2-tribromo-3,3-dimethylbutane,
1-chloro-3,3-dimethylpentane,
1-bromo-3,3-dimethylpentane,
2-chlor-2,3-dimethylpentane,
3-bromo-2,3-dimethylpentane,
1,1,2-trichloro-3,3-dimethylpentane,
1,1,2-tribromo-3,3-dimethylpentane,
1-chloro-3,3-dimethylhexane,
1-bromo-3,3-dimethylhexane,
1,1,2-trichloro-3,3-dimethylhexane,
1,1,2-tribromo-3,3-dimethylhexane,
1-(2-chloroethyl)-1methylcyclopentane,
1-(2,2-dichloroethyl)-1-methylcyclohexane, 1-(2,2-dibromoethyl)-1-methylcyclohexane, etc. It is to be understood that these compounds are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 47 grams of t-butyl chloride (0.51 mole) and 50 grams (0.52 mole) of cis-dichloroethylene were placed in an Erlenmeyer flask along with 16 grams of a catalyst complex. The complex was prepared by admixing equimolar quantities of anhydrous aluminum chloride powder and anhydrous cupric chloride powder; after an induction period of about 0.5 minute, during which there was little change, there was an evolution of heat accompanied by some evolution of hydrogen chloride, the final product being a mustard-colored powder. The mixture of reactants and catalyst were magnetically stirred at room temperature and atmospheric pressure for a period of 2 hours. At the end of this time, the reaction product was recovered and separated from the catalyst which was in granular form by filtration. The product was then subjected to analysis by means of a gas-liquid chromatograph, there being a 65% yield of 1,1,2-trichloro-3,3-dimethylbutane.

EXAMPLE II

In this example a solution of 46 grams (0.5 mole) of t-butyl chloride in 150 grams of n-pentane is placed in the glass liner of a rotating autoclave of 850 ml. capacity along with 17 grams of a catalyst complex which had been prepared by admixing equimolar anhydrous aluminum chloride powder and anhydrous cupric chloride powder. The liner is sealed into the autoclave and ethylene is pressed in until an initial pressure of 40 atmospheres is reached. The autoclave is then rotated for a period of about 4 hours at room temperature. At the end of this time the excess pressure is discharged and the reaction mixture is separated from the catalyst by filtration. A gas-liquid chromatographic analysis of the product will disclose the presence of neohexyl chloride (1-chloro-3,3-dimethylbutane).

EXAMPLE III

In this example a solution of 53 grams (0.5 mole) of t-pentyl chloride in 100 grams of heptane is placed in the glass liner of a rotating autoclave containing 12 grams of a catalyst complex comprising an admixture of equimolar quantities of anhydrous aluminum chloride and anhydrous cupric chloride. The liner is sealed into the autoclave and ethylene is pressed in until an initial pressure of 40 atomospheres is reached. The autoclave is rotated for a period of 4 hours, at the end of which time, the excess pressure is discharged. The product is recovered and separated from the catalyst by means of filtration, following which, said product is subjected to a gas-liquid chromatographic analysis. This analysis will disclose the presence of 1-chloro-3,3-dimethylpentane.

EXAMPLE IV

In this example 88.5 grams (0.5 mole) of 1-methylcyclohexyl bromide and 53.5 grams (0.5 mole) of vinyl bromide are placed in an Erlenmeyer flask along with 20 grams of a catalyst comprising an aluminum chloride-cupric chloride complex. The flask is magnetically stirred for a period of 2 hours at room temperature. At the end of the aforementioned residence time, the product is separated from the catalyst by filtration and subjected to a gas-liquid chromatographic analysis. This analysis will disclose the presence of 1-(2,2-dibromoethyl)-1-methylcyclohexane.

EXAMPLE V

Into the glass liner of a rotating autoclave is placed 62.5 grams (0.5 mole) of isopropyl bromide and 100 grams of pentane solvent along with 15 grams of a catalyst comprising an aluminum chloride-cupric chloride complex which is prepared according to the above examples. The glass liner is sealed into the autoclave and ethylene is pressed in until 40 atmospheres is reached. The autoclave is rotated for a period of 4 hours, at the end of which time, the excess pressure is discharged and the reaction product is recovered. The product is separated from the catalyst by filtration and subjected to a gas-liquid chromatographic analysis, said analysis disclosing the presence of 1-bromo-3,3-dimethylpentane.

I claim as my invention:

1. In the catalytic condensation of an alkyl halide or cycloalkyl halide with an unsaturated hydrocarbon or a halogenated unsaturated hydrocarbon to form a higher molecular weight haloalkane or halocycloalkane, the improvement which comprises effecting said condensation in the presence, as a catalyst, of a composition prepared by admixing equimolar quantities of anhydrous aluminum chloride and anhydrous cupric chloride.

2. The process as set forth in claim 1 in which said condensation is effected at a temperature in the range of from about 10° C. to about 50° C. and a pressure in the range of from about atmospheric to about 100 atmospheres.

3. The process as set forth in claim 1 in which said halide comprises t-butyl chloride.

4. The process as set forth in claim 1 in which said halide comprises t-pentyl chloride.

5. The process as set forth in claim 1 in which said halide comprises 1-methylcyclohexyl bromide.

6. The process as set forth in claim 1 in which said halide comprises isopropyl bromide.

7. The process as set forth in claim 1 in which said halide is reacted with ethylene.

8. The process as set forth in claim 1 in which said halide is reacted with cis-1,2-dichloroethylene.

9. The process as set forth in claim 1 in which said higher molecular weight haloalkane comprises 1-chloro-3,3-dimethylpentane.

10. The process as set forth in claim 1 in which said higher molecular weight halocycloalkane comprises 1-(2,2-dibromoethyl)-1-methylcyclohexane.

11. The process as set forth in claim 1 in which said higher molecular weight haloalkane comprises 1-bromo-3,3-dimethylpentane.

12. The process as set forth in claim 1 in which said higher molecular weight haloalkane comprises 1-chloro-3,3-dimethylbutane.

13. The process as set forth in claim 1 in which said higher molecular weight haloalkane comprises 1,1,2-trichloro-3,3-dimethylbutane.

References Cited

UNITED STATES PATENTS

| 2,533,052 | 12/1950 | Schmerling | 260—648 |
| 2,597,016 | 5/1952 | McBee et al. | 260—648 |
| 3,454,657 | 7/1969 | Decker et al. | 260—648 |

DANIEL D. HORWITZ, Primary Examiner

U.S. Cl. X.R.

260—658 C; 252—442